Patented Oct. 24, 1939

2,176,896

UNITED STATES PATENT OFFICE 2,176,896

QUATERNARY AMMONIUM DERIVATIVES OF AMIDES

Albert K. Epstein and Morris Katzman, Chicago, Ill.

No Drawing. Application August 4, 1938,
Serial No. 222,995

16 Claims. (Cl. 260—295)

This invention relates to new chemical compounds of the quaternary ammonium type which are characterized by possessing interface modifying properties rendering the same highly useful for the purposes for which such agents are employed in the various arts.

At least most of the novel compounds fall within the scope of the general formulae

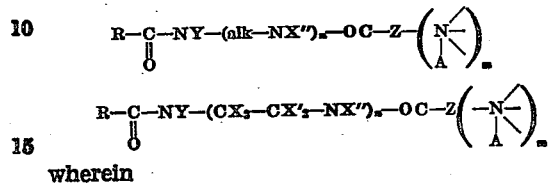

wherein

is an acyl radical containing at least four and particularly from twelve to eighteen carbon atoms, Y, X, X' and X'' are the same or dissimilar members selected from the group consisting of hydrogen, alkyl, cycloalkyl, and alkylol, alk is a hydrocarbon residue, saturated or unsaturated, with or without interruptions or substitutions, Z is a hydrocarbon residue preferably containing less than six carbon atoms, A is an anion, $m$ is a whole number, preferably one or two, $n$ is a whole number, preferably from one to four, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

A more limited aspect of the compounds of the invention may be represented by the general formula

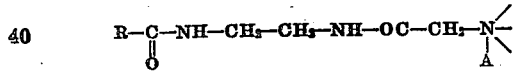

wherein

is an aliphatic acyl radical containing at least eight and preferably from twelve to eighteen carbon atoms.

The radical

in the above formula may be of aliphatic, cycloaliphatic, aromatic or aromatic-aliphatic character, as will be pointed out hereinafter, and may contain substituent groups such as halogen, amino, hydroxy, sulphate, sulphonic, phosphate, carboxyl, nitrile, and the like, but it is particularly preferred that it be unsubstituted aliphatic or fatty and contain from twelve carbon atoms to eighteen carbon atoms. Z and alk may also each contain substituent groups such as those mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention.

(1) $C_{11}H_{23}$—C—NH—CH$_2$—CH$_2$—NH—OC—CH$_2$—N(C$_2$H$_4$OH)$_3$ Cl (2) $C_{17}H_{35}$—C—NH—CH$_2$—CH$_2$—CH$_2$—NH—OC—CH$_2$—N⟨⟩ Cl (3) $C_{13}H_{27}$—C—NH—CH—CH$_2$—NH—OC—CH$_2$—N⟨⟩ CH$_3$ Br (4) $C_7H_{15}$—C—NH—CH$_2$—CH$_2$—NH—OC—(CH$_2$)$_3$—N⟨⟩ Cl (5) ⟨⟩—C—NH—CH$_2$—CH$_2$—NH—OC—CH$_2$—N⟨⟩ Cl (6) $C_{11}H_{23}$—C—NH—C$_2$H$_4$—NH—C$_2$H$_4$—NH—OC—CH$_2$—N(C$_2$H$_5$)$_3$ Cl (7) $C_{11}H_{23}$—C—NH—CH$_2$—CH$_2$—NH—OC—CH$_2$—N(C$_2$H$_4$OH)$_2$ Cl H (8) H$_3$C—CH$_2$
H$_3$C     CH—C—NH—CH$_2$—CH$_2$—NH—OC—CH$_2$—N⟨⟩
H$_3$C—CH$_2$                    Br (9) $C_{10}H_{21}$—C—N—CH$_2$—CH$_2$—N—OC—CH$_2$—N(C$_2$H$_4$OH)$_3$
         CH$_3$        CH$_3$      Cl

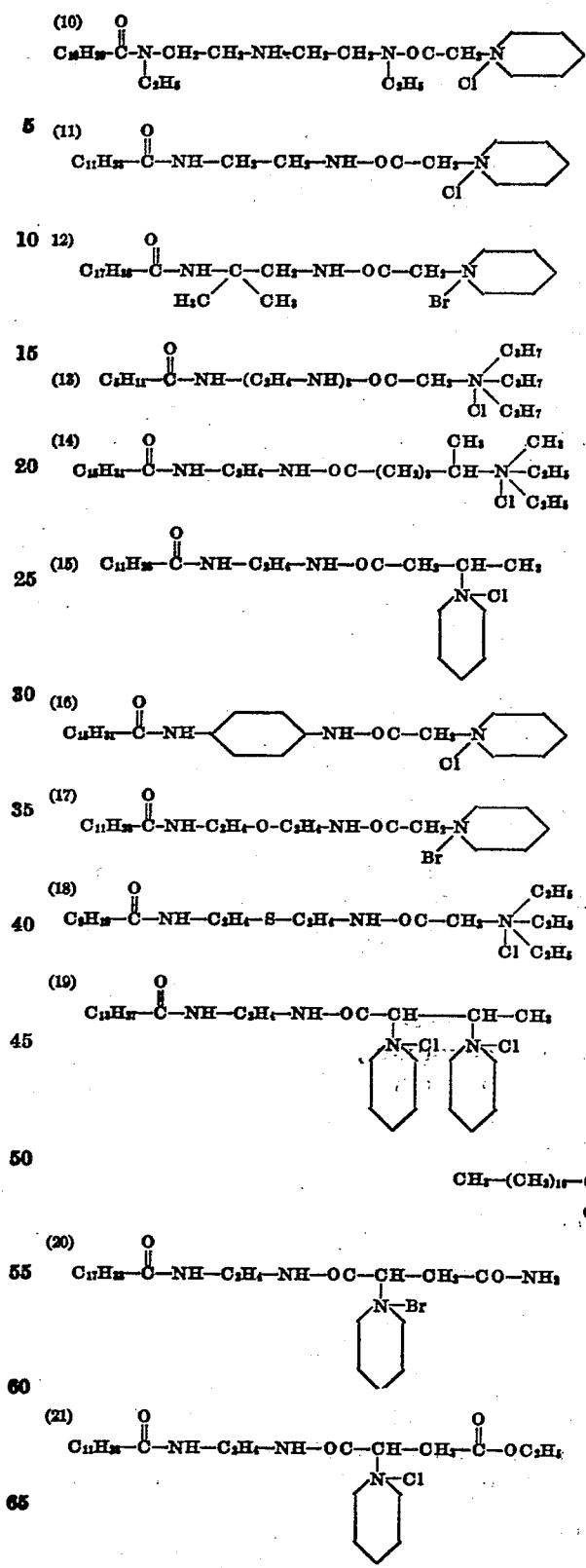

ethylene diamine ($H_2N-C_2H_4-NH_2$) with a higher molecular weight carboxylic acid or derivative thereof such as halide, under conditions such as to insure a substantial yield of amide. The resulting amide is then reacted with a preferably lower molecular weight halogenocarboxylic acid or halide or other derivative thereof to produce another amide linkage and with an organic nitrogenous base such as pyridine to produce a pentavalent nitrogen. It will be clear, of course, that the order of the steps may be reversed, if desired; that is the reaction with the higher molecular weight acid or derivative thereof may be carried out last, or the two amidification steps may be carried out in optional order and the reaction with the pyridine or the like may be carried out thereafter.

The following examples are illustrative of methods which have been found suitable for preparing various of the compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 350 grams of monostearin and 300 grams of triethylene tetra-amine were heated together at 220 degrees C. for 3 to 4 hours and then the displaced glycerin and the excess triethylene tetra-amine were washed out with water and the resulting product dried.

(2) To the product resulting from part (1) hereof there were added slowly, with stirring, 113 grams of chloracetyl chloride and the mixture was then heated for ½ hour at 60-70 degrees C.

(3) 230 grams of the reaction product of part (2) hereof were mixed with 100 cc. of pyridine, the mixture was warmed to 40 degrees C. and then allowed to stand over-night. The excess pyridine was then washed out with petroleum ether and the final product contained a substantial proportion of the compound having the graphic formula

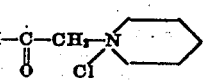

The product had foaming and wetting properties adapting it for various of the uses hereinafter described.

*Example B*

(1) 136 grams of the isopropyl alcohol ester of chloracetic acid, 126 grams of isopropyl alcohol, and 85 grams of pyridine were mixed and heated on a water bath, with stirring, for from 8 to 10 hours or until substantially all of the organic chlorine was titratable as a chlorine ion.

(2) The reaction product obtained in part (1) hereof was then added slowly, with stirring, to 65 grams of ethylene diamine, the mixture being cooled to 10 degrees C. After the reaction was over, the isopropyl alcohol was evaporated.

(3) The dried product obtained in part (2) hereof was suspended in 300 cc. of pyridine to which were added dropwise, with stirring and cooling to from 5-10 degrees C., 300 grams of stearoyl chloride. At the end of the addition, the reaction mass was warmed to about 50 degrees C. and the product was finally washed with While the above examples represent single substances, it will be understood that in practice it is, in general, more advantageous to employ mixtures of any two or more thereof with or without diluents.

In general, the compounds are prepared by initially reacting a polyamine, for example, petroleum ether to eliminate the excess pyridine. The product, which had good surface modifying activity, contained a substantial amount of a chemical compound having the graphic formula

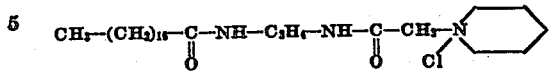

Example C (1) 122 grams of the ethyl alcohol ester of chloracetic acid and 100 cc. of pyridine were warmed at 60 degrees C. for one hour, mixed well, and then allowed to stand for two days.

(2) 75 grams of the product produced in accordance with part (1) hereof, 75 grams of the lauric acid amide of diethylene triamine and 200 cc. of water were heated together, with stirring, for one hour at 90 degrees C. The resulting product, which may be used effectively without further purification, contained a substantial proportion of a chemical compound having the graphic formula

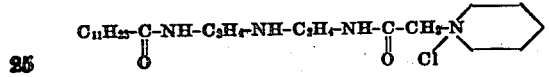

Example D (1) 136 grams of the isopropyl alcohol ester of chloracetic acid and 240 grams of pyridine were mixed together and warmed to 50 degrees C. and then allowed to stand at room temperature overnight.

(2) 188 grams of the product resulting from part (1) hereof were added slowly, with stirring, to 51 grams of diethylene triamine, the reaction temperature being kept below 10 degrees C. After the addition was completed, the reaction product was warmed to 30 degrees C. to 40 degrees C. and was then dried in vacuum.

(3) The dried product of part (2) hereof was then suspended in 150 grams of pyridine and to this suspension there were added dropwise, with stirring, 100 grams of lauroyl chloride, the temperature being maintained during the addition at from 5 degrees C. to 10 degrees C. The reaction mixture was then warmed to about 40 degrees C. and the excess pyridine was washed out with petroleum ether. The product, which had good surface modifying characteristics adapting it for various uses hereinafter set forth, contained a substantial proportion of a compound having the graphic formula:

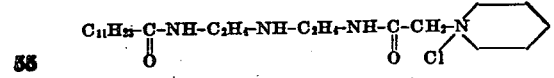

The acyl radical represented by

in the general formulae may, as stated, be derived from various sources. Among such sources may be mentioned straight chain and branched chain carboxylic, aliphatic, and fatty acids or derivatives thereof such as halides, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alphahydroxy higher aliphatic and fatty acids such as 1-hydroxy stearic acid, dihydroxystearic acid, alpha-hydroxy stearic acid, alphahydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

It has previously been indicated that the anion represented by the letter A in the general formula illustrating most of the novel agents of the present invention is preferably a solubilizing anion such as chlorine, bromine or iodine. Other anions may be substituted therefor as, for example, OH−, HSO4−, RSO4−, C6H5SO3−, NO3−, acetate, propionate, caproate, laurate, oleate, stearate, borate, phosphate, or some other organic or inorganic anion. As a general rule the halogen derivatives are particularly satisfactory.

The halogeno-carboxylic acids or other derivatives thereof, preferably in the form of their esters with ethyl alcohol or the like, which are reacted with the polyamines may be selected from a relatively large class including mono-, di- and poly-carboxylic derivatives as, for example, mono-chloracetic acid, mono-bromacetic acid, chloracetyl chloride, bromacetyl bromide, mono iodoacetic acid, iodo acetyl iodide, alpha-chlor propionic acid, alpha-chlor butyric acid, alpha-bromo capric acid, mono-chlor succinyl chloride, di-chlor succinyl chloride, mono-chlor succinic acid, di-chlor succinic acid, di-chlor glutaryl chloride, nitrochloro-benzoyl chlorides and the like. Of particular utility are ethyl chloracetate and ethyl bromacetate.

The polyamines which are employed in the reactions may be selected from a large group, particularly the alkylene polyamines and polyalkylene polyamines and the alkyl and aralkyl derivatives as, for example, ethylene diamine, piperazine, diethylene triamine, triethylene tetraamine, mono-methyl ethylene diamine, monoethyl diethylene triamine, beta-dimethylaminoethyl amine, and the like.

The pentavalent nitrogen present in the novel substances of the present invention may be introduced into the molecule by means of various organic nitrogenous bases as, for example, alcohol amines and alkylol-, arylol- and aralkylol amines including mono-, di- and tri-ethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl mono-ethanolamine, diethyl-mono-ethanolamine, 1-amino-2, 3 propanediol, 1,2-diaminopropanol; alkylamines such as butyl amine, hexylamine, dimethylamine, ethylene diamine, diethylene triamine, triethylene tetra-amine, mono-methyl ethylene diamine, mono-ethyl diethylene tetraamine, mono-allyl amine, aromatic and heterocyclic bases such as benzylamine, cyclo-hexylethyl-aniline, morpholine, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

The compounds of this invention have utility in various arts in which interface modifying agents are employed. They are resistant to precipitation by calcium and magnesium salts and are compatible with acid and alkali media. They may be utilized in the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleaning, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulpho-succinate, dilauryl potassium sulpho-glutarate, lauryl mono-ethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey red oils; compounds of the type of isopropyl naphthalene sodium sulphonate, and other classes of wetting agents.

Wherever the term "higher" is employed as referring to higher molecular weight organic acids, it will be understood to cover at least six carbon atoms unless otherwise specifically stated.

What we claim as new and desire to protect by Letters Patent of the United States is:

1. Chemical compounds corresponding to the general formula

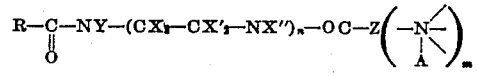

wherein

is an acyl radical containing at least four carbon atoms, Y, X, X' and X'' are the same or dissimilar members selected from the group consisting of hydrogen, alkyl, cycloalkyl, and alkylol, Z is a hydrocarbon residue, A is an anion, $m$ and $n$ are whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

2. Quaternary ammonium chemical compounds corresponding to the general formula

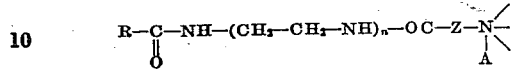

wherein

is an acyl radical containing from eight to eighteen carbon atoms, Z is a hydrocarbon radical containing from one to four carbon atoms, A is an anion, $n$ is a number ranging from one to three, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

3. Chemical compounds corresponding to the general formula

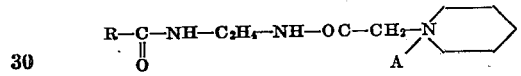

wherein

is an acyl radical containing from eight to eighteen carbon atoms, and A is halogen.

4. Chemical compounds corresponding to the general formula

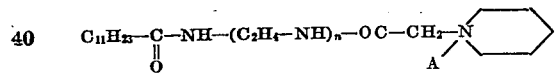

wherein $n$ is a whole number and A is halogen.

5. Chemical compounds corresponding to the general formula

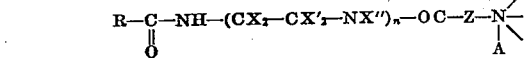

wherein

is an acyl radical containing at least six carbon atoms, X, X' and X" are the same or dissimilar members selected from the group consisting of hydrogen, alkyl, cycloalkyl and alkylol, Z is a hydrocarbon residue containing not more than six carbon atoms, A is an anion, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

6. Quaternary ammonium chemical compounds corresponding to the general formula

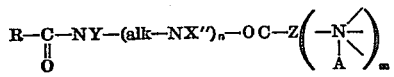

wherein

is an acyl radical containing at least six carbon atoms, Y and X" are the same or dissimilar members selected from the group consisting of hydrogen, alkyl, cycloalkyl, and alkylol, alk is a hydrocarbon residue with or without interruptions or substitutions, Z is a hydrocarbon residue containing not more than six carbon atoms, $n$ and $m$ are whole numbers, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

7. Chemical compounds corresponding to the general formula

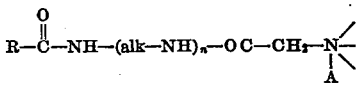

wherein

is an aliphatic acyl radical containing from eight to eighteen carbon atoms, alk is an aliphatic hydrocarbon residue with or without interruptions or substitutions, A is halogen, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

8. Chemical compounds corresponding to the general formula

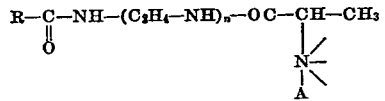

wherein

is a fatty acid acyl radical containing from eight to eighteen carbon atoms, A is halogen, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

9. Chemical compounds corresponding to the general formula

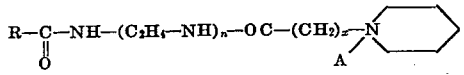

wherein

is a fatty acid acyl radical containing from eight to eighteen carbon atoms, A is halogen, and $n$ and $x$ are whole numbers ranging from one to four.

10. Chemical compounds corresponding to the general formula

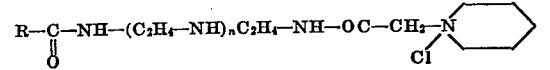

wherein

is an acyl radical containing from eight to eighteen carbon atoms, and $n$ is zero or a whole number.

11. A method of preparing chemical compounds which comprises reacting, in optional order, a polyamine with a higher molecular weight carboxylic acid or derivative thereof containing at least six carbon atoms to produce a substantial yield of an amide, then reacting the resulting amide with a tertiary nitrogenous base and with a member selected from the group consisting of halogeno-carboxylic acids and halides thereof.

12. The method of claim 11 wherein the polyamine falls within the scope of the formula $$H_2N-(CX_2-CX'_2-NH-)_nCX''_2-CX'''_2-NH_2$$

wherein X, X', X'' and X''' are similar or dissimilar members selected from the group consisting of hydrogen, alkyl, cycloalkyl, and alkylol, and $n$ is zero or a whole number.

13. The method of claim 11 wherein the polyamine falls within the scope of the following formula $$H_2N-(C_2H_4-NH-)_nC_2H_4-NH_2$$

wherein $n$ is zero or a whole number, and the halogeno-carboxylic acid and halides thereof are selected from the group consisting of chloracetic acid, chloracetyl chloride, bromacetic acid, and bromacetyl bromide.

14. A method of preparing chemical compounds which comprises reacting an ester of a lower molecular weight aliphatic halogeno-carboxylic acid with a tertiary nitrogenous base and reacting the resulting product with a higher organic acid amide of a polyamine.

15. The method of claim 14 wherein the tertiary nitrogenous base is heterocyclic, the organic acid amide is derived from a fatty acid containing from 8 to 18 carbon atoms and the polyamine falls within the scope of the following formula $$H_2N-(C_2H_4-NH-)_n-C_2H_4-NH_2$$

wherein $n$ is zero or a whole number.

16. A method of preparing quaternary ammonium compounds which comprises reacting, in optional order, an aliphatic polyamine to produce an amide, at one terminal end of said polyamine, of an aliphatic acid containing from 8 to 18 carbon atoms, and introducing, at the other terminal end of said polyamine, an amide linkage containing a quaternary ammonium radical.

ALBERT K. EPSTEIN.
MORRIS KATZMAN.